United States Patent [19]

Torigai

[11] Patent Number: 4,741,162
[45] Date of Patent: May 3, 1988

[54] ENGINE WITH TURBO-CHARGER FOR AN OUTBOARD MOTOR

[75] Inventor: Katsumi Torigai, Hamamatsu, Japan

[73] Assignee: Sanshin Kogyo Kabushiki Kaisha, Hamamatsu, Japan

[21] Appl. No.: 870,613

[22] Filed: Jun. 4, 1986

[30] Foreign Application Priority Data

Jun. 4, 1985 [JP] Japan .................... 60-119828

[51] Int. Cl.⁴ .................................... F02B 29/04
[52] U.S. Cl. .................................... 60/599; 60/612
[58] Field of Search .............. 60/599, 605, 612; 123/563

[56] References Cited

U.S. PATENT DOCUMENTS 4,028,892  6/1977  Hinkle ............................ 60/599
4,630,446 12/1986  Iwai et al. ...................... 60/605 X

FOREIGN PATENT DOCUMENTS 1326503  8/1973  United Kingdom .............. 60/599

OTHER PUBLICATIONS

SAE paper No. 851,473, "The Influence of Vehicle Installation in the Design of Chassis Mounted Coolers", Agee, 1985.

Primary Examiner—Michael Koczo
Attorney, Agent, or Firm—Ernest A. Beutler

[57] ABSTRACT

An outboard motor including a turbo-charged intercooled internal combustion engine of the two cycle crankcase compression type. The turbo-chargers for the engine are driven by exhaust gases flowing through an exhaust manifold on one side of the engine and deliver a compressed charge to an intercooler that extends across the top of the engine. The intercooler discharges to an induction system that is disposed on the side of the engine opposite to the exhaust manifold side.

8 Claims, 4 Drawing Sheets

ENGINE WITH TURBO-CHARGER FOR AN OUTBOARD MOTOR

BACKGROUND OF THE INVENTION

This invention relates to an engine with a turbo-charger for an outboard motor and more particularly to an improved and compact turbo-charged and intercooled internal combustion engine.

It is well known that the power output of an internal combustion engine can be improved through the use of turbo-charging. The turbo-charger compresses the inlet air charge delivered to the engine and hence offers a possibility for increasing its power output. However, the utilization of a compressor for the intake air charge causes a rise in temperature of the intake air charge and this can reduce the actual output generated by the supercharging. It has, therefore, been proposed so as to cool the compressed charge through the use of an intercooler. These concepts are frequently employed with two-cycle internal combustion engines which are particularly advantageous applications for turbo-charging and the use of intercoolers.

However, one of the largest applications for two-cycle internal combustion engines is in connection with the power unit for an outboard motor. Because of the extremely compact nature of an outboard motor, it is desirable to provide a larger than normal power to weight ratio and power to size ratio for such an engine. Thus, there is a particular desirability towards turbo-charging the driving engine of an outboard motor. However, these space limitations of an outboard motor make it very difficult to locate a turbo-charger so as to provide effective and efficient turbo-charging. Furthermore, the very compact space of an outboard motor makes it very difficult to achieve adequate, if any, intercooling.

It is, therefore, a principal object of this invention to provide an improved arrangement for turbo-charging an engine.

It is a further object of this invention to provide an improved, turbo-charged outboard motor.

It is a still further object of this invention to provide an improved arrangement for turbo-charging and intercooling an outboard motor.

SUMMARY OF THE INVENTION

This invention is adapted to be embodied in a turbo-charger arrangement for an internal combustion engine comprising a plurality of aligned combustion chambers having respective exhaust ports communicating with an exhaust conduit extending along a side of the engine. A turbo-charger is provided that has a turbine stage with an exhaust inlet that communicates with the exhaust conduit and which is disposed adjacent to the exhaust conduit. The turbo-charger further includes a compressor stage driven by the turbine stage. An intercooler is located along one side of the engine other than the side on which the exhaust conduit is positioned and means are provided for delivering a compressed charge from the compressor stage to the intercooler.

DETAILED DESCRIPTION OF THE PREFERRED EMBODIMENT

Figure 1:
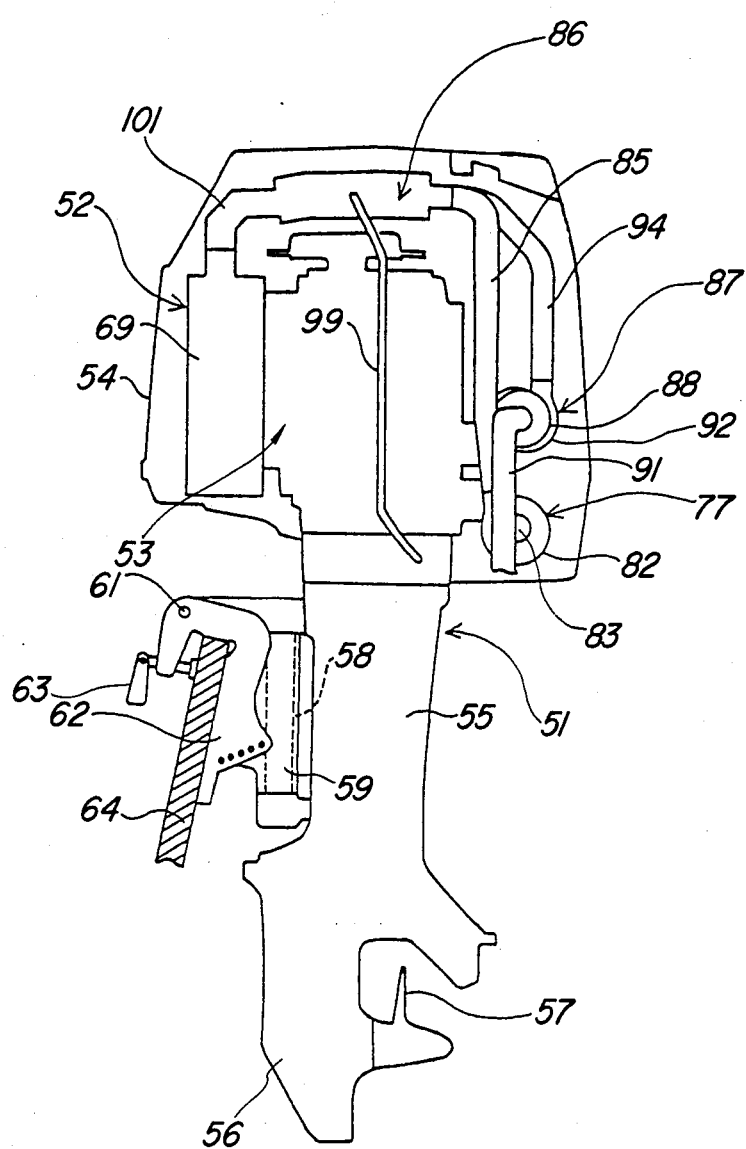
FIG. 1 is a side elevational view of an outboard motor constructed in accordance with an embodiment of the invention.
Figure 2:
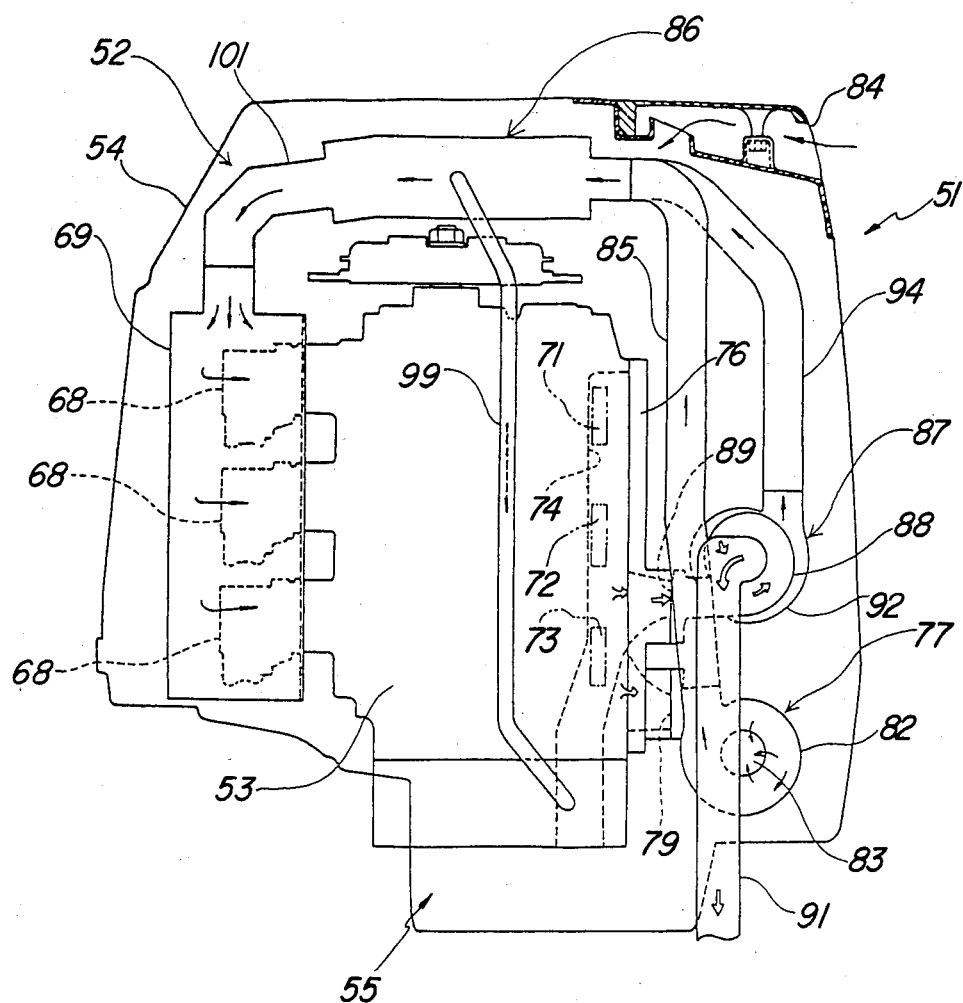
FIG. 2 is an enlarged side elevational view, with portions broken away, of the power head of this embodiment.

An outboard motor constructed in accordance with an embodiment of the invention is identified generally by the reference numeral 51. The outboard motor 51 includes a power head assembly, indicated generally by the reference numeral 52 and including an internal combustion engine, indicated generally by the reference numeral 53, and a surrounding protective cowling 54. As is typical with outboard motor practice, the engine 53 is disposed so that its output shaft (not shown) rotates about a vertically extending axis and drives a drive shaft (not shown) that is journaled within a drive shaft housing 55 positioned at the lower end of the power head 52. This drive shaft extends into a lower unit 56 in which a known type of forward, neutral, reverse transmission is contained for driving a propeller 57 in selected forward or reverse directions.

The outboard motor 51 further includes a steering shaft 58 that is fixed to the drive shaft housing 55 and which is journaled for steering movement within a swivel bracket 59. The swivel bracket 59 is, in turn, pivotally connected by a horizontally extending tilt pin 61 to a clamping bracket 62. The clamping bracket 62 carries a clamping device 63 for affixing the outboard motor 51 to a transom 64 of an associated watercraft. The construction of the outboard motor as thus far described may be considered to be conventional and, for that reason, details of the outboard motor which are not critical to the invention have not been illustrated and will not be described in any more detail.

The engine 53 is, in the illustrated embodiment, of the V type having opposed banks of cylinders which are defined by a cylinder block 65. Respective cylinder heads 66 are affixed to the cylinder banks and form the combustion chambers, as is well known in this art.

The engine 51 operates upon the two-stroke, crankcase compression principle. To this end, the individual crankcase chambers are sealed from each other and an induction system comprising an intake manifold 67 is provided for delivering a fuel/air charge to these individual crankcase chambers. This induction system further includes a plurality of vertically spaced carburetors 68 that draw an air charge from a plenum chamber, air silencing device 69. In the engine as will be described, the plenum chamber 69 is provided with a source of pressurized air.

Each bank of cylinders is provided with respective, vertically spaced exhaust ports 71, 72 and 73. The exhaust ports 71, 72 and 73 associated with one cylinder bank all communicate with a vertically extending exhaust passage 74. In a similar manner, the exhaust ports 71, 72 and 73 of the other cylinder bank communicate with a vertically extending exhaust passgae 75 which extends parallel to and in spaced side-by-side relationship with the exhaust passage 74. The exhaust passages 74 and 75 open through an outer face of the cylinder block 53 and are closed by means of an exhaust cover plate 76.

A first turbo-charger, indicated generally by the reference numeral 77 is associated with the exhaust passage 74 for boosting the inlet charge delivered to the engine, in a manner as will be described. The turbo charger 77 has a turbine stage 78 that has an exhaust gas inlet opening 79 that communicates with the exhaust passage 74 at a point downstream of a point P2, which is located below the points where the exhaust ports 71, 72 and 73 enter the exhaust passage 74. The exhaust gases are discharged from the turbine 78 through an exhaust discharge pipe 81.

The turbo-charger 77 further includes a compressor stage 82 that draws atmospheric air through an air inlet 83. The inlet 83 is in communication with the interior or the protective cowling 54 and air is delivered to this interior through an air inlet opening formed in the cowling and identified by the reference numeral 84 (FIG. 1). The compressor stage 82 discharges the compressed air through a conduit 85 to an intercooler device, indicated generally by the reference numeral 86, and which will be described later in more detail.

The engine 52 is provided with a further turbocharger, indicated generally by the reference numeral 87. The turbo-charger 87 has a turbine stage 88 which has an inlet opening 89 that communicates with the exhaust passage 75. It should be noted that the opening 89 is axially spaced from the inlet opening 79 of the turbo-charger turbine stage 78 so that the turbo-chargers are staggered with respect to each other. This facilitates the positioning of the turbo-chargers in the relatively compact area of the protective cowling 54 while at the same time permitting them both to be driven effectively from the exhaust gases. It should be noted that the opening 89 is positioned downstream of the point P1 so that at least two of the exhaust ports 71 and 72 are upstream of it. The turbine stage 88 of the turbo-charger 87 discharges through an exhaust pipe 91, which is disposed on the opposite side of the engine from the exhaust pipe 81.

The turbo-charger 87 is also provided with a compressor section 92 that has an inlet opening 93 which draws air from the interior of the protective cowling 54. Air under pressure is discharged from the compressor stage 92 through a pressure air delivery line 94 which, in turn, delivers the air to the intercooler 86 on the side of the engine opposite to the turbo-charger outlet conduit 85.

It should be noted that the turbo-charger turbine stages 82 and 92 are positioned laterally outwardly of the exhaust passages 74 and 75 and hence will be in a cooler area even though the engine is extremely compact. Hence, there will be little loss in volumetric efficiency due to heating of the intake charge.

Figure 3:
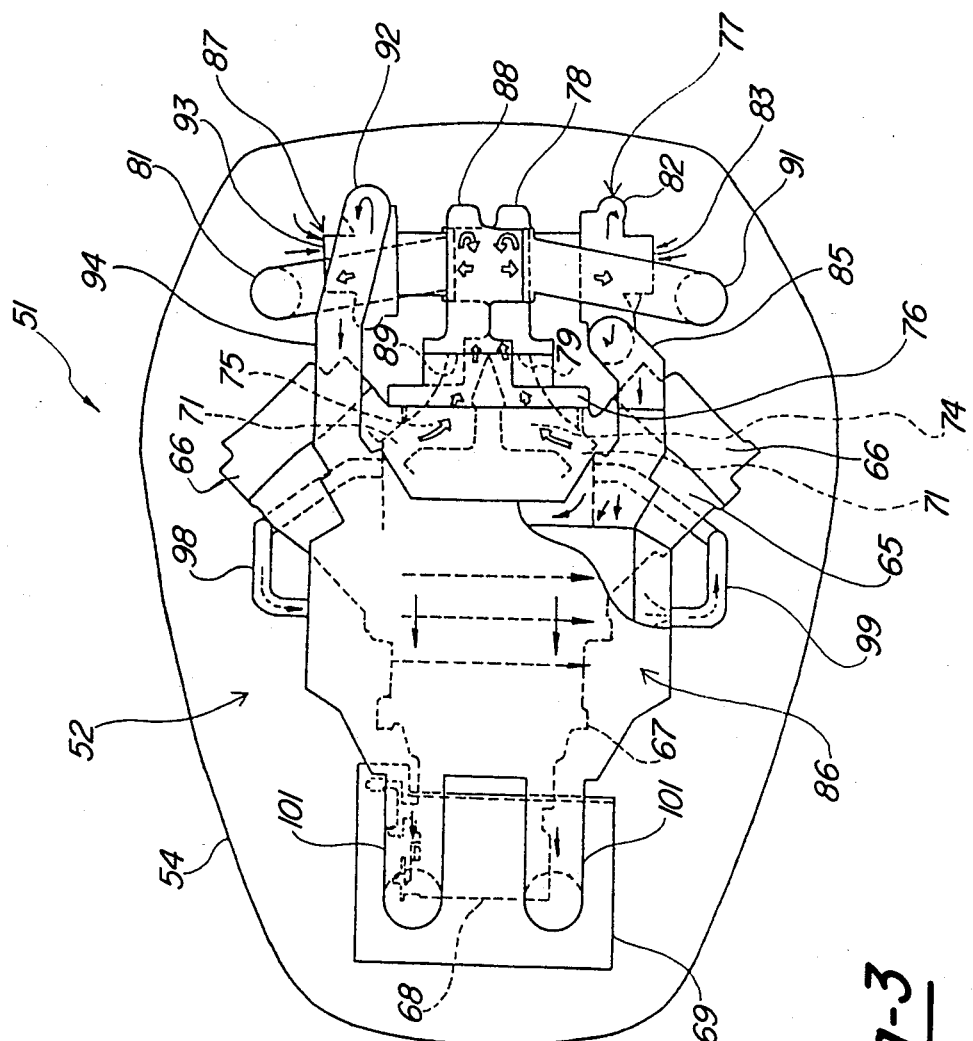
FIG. 3 is an enlarged top plan view of the power head of this embodiment.
Figure 4:
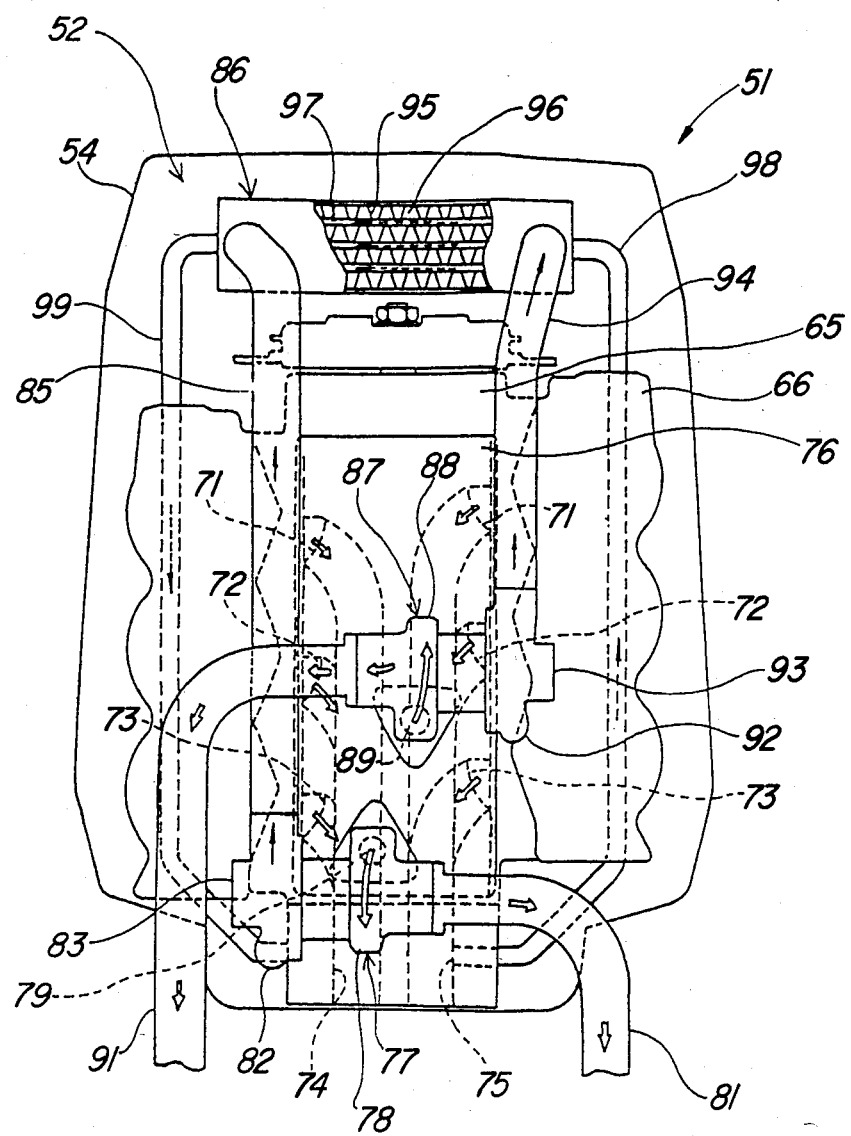
FIG. 4 is an enlarged rear elevational view of the power head of this embodiment.

The output of the engine 51 is further increased due to the use of the intercooler 86. It should be noted that the intercoolder 86 is provided with a plurality of internal fins 95 that define transversely extending air passages 96 through which the pressurized air may flow from the exhaust side of the engine 51 to the intake side. Tubes 97 extend between the passages 96 and receive coolant from the engine cooling system through a coolant delivery conduit 98. The coolant that has been utilized to cool the intake charge is returned to the engine cooling system through a coolant return passage 99. The flow of coolant is transverse to the direction of air flow as may be seen in FIG. 3. In this way, very effective intercooling is achieved that will, as has been noted, act to provide a greater volumetric efficiency for the engine and, accordingly, a greater specific output.

From the intercooler 89, air is delivered to the silencing device 69 through a pair of air delivery conduits 101. The conduits 101 extend on opposite sides of the engine and act to pressurize the air within the intake device 69.

It should be readily apparent from the foregoing description that a relatively compact and yet extremely efficient arrangement is provided for locating a turbocharger and associated intercooler where they will not interfere with each other and yet therein the engine is so compact that it may be utilized as the powering unit for an outboard motor. Although an embodiment of the invention has been illustrated and described, it is to be understood that various changes and modifications may be made without departing from the spirit and scope of the invention, as defined by the appended claims.

What is claimed:

1. An outboard motor for propelling a watercraft through a body of water, said outboard motor comprising an internal combustion engine having an output shaft, clamping means for affixing said outboard motor to a transom of the watercraft with said output shaft rotating about a vertically extending axis, a watercraft propulsion device positioned beneath said engine, driven by said output shaft and cooperable with the body of water for propelling the watercraft therethrough, an exhaust conduit extending vertically downwardly along one vertical side of the engine, induction ports for said chambers positioned on a vertical side of said engine opposite to said one side, a turbo-charger having a turbine stage with an exhaust inlet communicating with said exhaust conduit and disposed adjacent to said exhaust conduit on said one vertical side of said engine, a compressor stage driven by said turbine stage, an intercooler located along the top of the engine and extending in a horizontal plane, means for delivering a compressed air charge from said compressor stage to said intercooler, and means for delivering the compressed air from said intercooler to said induction ports.

2. An outboard motor as set forth in claim 1 further including means for delivering coolant from the engine to the intercooler for cooling the compressed charge.

3. An outboard motor as set forth in claim 1 further including a protective cowling encircling the internal combustion engine, the turbo-charger and the intercooler.

4. An outboard motor as set forth in claim 3 wherein the engine is a two-cycle, crankcase compression engine.

5. An outboard motor as set forth in claim 1 wherein the engine is of the V-type and has combustion chambers disposed at an angle to each other, the exhaust conduit being positioned in the valley of the V of the engine.

6. An outboard motor as set forth in claim 5 wherein there are a pair of turbo-chargers each driven by an exhaust conduit served by exhaust ports of a respective one of the banks.

7. An outboard motor as set forth in claim 6 further including means for delivering coolant from the engine to the intercooler for cooling the compressed charge.

8. An outboard motor as set forth in claim 7 wherein the compressed air flows through the intercooler in a generally horizontal plane from the one side of the engine to the other side and the coolant from the engine flows in a horizontal plane in a direction extending perpendicularly to the direction of compressed air flow.

* * * * *